(12) United States Patent
Gunnarsson et al.

(10) Patent No.: US 8,165,590 B2
(45) Date of Patent: Apr. 24, 2012

(54) NEIGHBOR CELL RELATION LIST INITIALIZATION

(75) Inventors: Fredrik Gunnarsson, Linköping (SE); Pål Frenger, Linköping (SE); Johan Moe, Mantorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 978 days.

(21) Appl. No.: 12/143,504

(22) Filed: Jun. 20, 2008

(65) Prior Publication Data

US 2009/0047968 A1 Feb. 19, 2009

Related U.S. Application Data

(60) Provisional application No. 60/955,510, filed on Aug. 13, 2007, provisional application No. 60/960,855, filed on Oct. 17, 2007.

(51) Int. Cl.
*H04Q 7/20* (2006.01)
(52) U.S. Cl. .................. 455/446; 455/436; 370/338
(58) Field of Classification Search .................. 455/444, 455/446, 561, 550.1, 436, 507, 11.1; 370/330, 370/332, 338
See application file for complete search history.

(56) References Cited

U.S. PATENT DOCUMENTS

| | | | |
|---|---|---|---|
| 2005/0272425 A1* | 12/2005 | Amerga et al. | 455/436 |
| 2007/0202866 A1 | 8/2007 | Tsuchiya | |
| 2007/0281696 A1 | 12/2007 | Vikberg et al. | |
| 2007/0293222 A1 | 12/2007 | Vikberg et al. | |
| 2008/0051088 A1 | 2/2008 | Tariq et al. | |
| 2008/0220782 A1 | 9/2008 | Wang et al. | |
| 2008/0242298 A1* | 10/2008 | Nylander et al. | 455/435.2 |
| 2008/0267153 A1* | 10/2008 | Mukherjee et al. | 370/338 |
| 2009/0011757 A1* | 1/2009 | Tenny | 455/425 |

(Continued)

FOREIGN PATENT DOCUMENTS

WO WO 2005/115042 1/2005

(Continued)

OTHER PUBLICATIONS

3GPP TS 36.300 v. 8.4.0, Release 8, Mar. 2008, AN-XP014041816; pp. 1-126.

(Continued)

*Primary Examiner* — Kamran Afshar
*Assistant Examiner* — Khawar Iqbal
(74) *Attorney, Agent, or Firm* — Nixon & Vanderhye P.C.

(57) ABSTRACT

Neighbor cell relation lists are initialized and managed in various ways that are especially beneficial to closed subscriber group (CSG) cells served by CSG base stations. Typically, only a radio terminal belonging to the CSG is permitted to access and receive service from the CSG cell. As a result, information is provided to radio terminals in the cells neighboring the CSG cell that generally indicates that radio terminals are not to report to a respective serving base station signal quality measurements of a signal received from the CSG base station unless the radio terminal is a member of the closed subscriber group for the CSG cell. When a CSG cell is powered-up, it is determined whether the CSG cell has previously been powered-on in the same environment. If so, the neighbor cell relation information for the CSG cell is updated with other network node(s). If not, neighbor cell relations of the CSG cell are initialized. In one example, when a new neighbor cell relation has been added to its neighbor cell relation list, the CSG base station inherits neighbor cell relation list entries from the newly-added neighbor cell.

23 Claims, 14 Drawing Sheets

U.S. PATENT DOCUMENTS

| | | | |
|---|---|---|---|
| 2009/0042596 A1* | 2/2009 | Yavuz et al. | 455/522 |
| 2009/0047960 A1* | 2/2009 | Gunnarsson et al. | 455/436 |
| 2009/0061937 A1* | 3/2009 | Rajasimman et al. | 455/561 |

FOREIGN PATENT DOCUMENTS

| | | |
|---|---|---|
| WO | PCT/EP2007/001737 | 2/2007 |
| WO | WO 2007/040454 | 12/2007 |

OTHER PUBLICATIONS

International Search Report and Written Opinion of the International Search Searching mailed Dec. 23, 2008 in corresponding PCT Application PCT/SE2008/050860.

3GPP TSG GERAN#38; Tdoc GP-080668; Measurement Reporting for GERAN / E-UTRAN Inter-working; Malaga, Spain, May 12-16, 2008.

3GPP TSG-GERAN WG2 Meeting #37bis; Tdoc G2-080231; LS on E-UTRAN Neighbor Cell List information for GERAN; Sophia Antipolis, France, Mar. 31-Apr. 3, 2008.

3GPP TSG GERAN#37bis; Tdoc G2-080134; Alternatives for E-UTRAN neighbour cell information; Sophia-Antipolis, France, Mar. 31-Apr. 3, 2008.

Office Action mailed Apr. 28, 2011 in co-pending U.S. Appl. No. 12/153,797.

U.S. Appl. No. 12/153,797, filed May 23, 2008; Inventor: Gunnarsson et al.

"*Active Mode Mobility Restriction for Home eNB*", Ericsson, Aug. 20-24, 2007.

\* cited by examiner

NEIGHBOR CELL RELATION LIST INITIALIZATION

PRIORITY APPLICATIONS

Priority is claimed from U.S. provisional patent applications Ser. Nos. 60/955,510, filed on Aug. 13, 2007, and 60/960,855, filed on Oct. 17, 2007, the disclosures of which are incorporated herein by reference.

TECHNICAL FIELD

The technical field relates to radio communications, and in particular, to cellular radio communications that involve neighbor cell relations.

BACKGROUND

In a typical radio communications system, radio communications terminals referred to as radio terminals or user equipment terminals UEs communicate via a radio access network (RAN) with other networks like the Internet. The radio access network (RAN) covers a geographical area which is divided into cells, with each cell being served by a base station, e.g., a radio base station (RBS), which in some networks is also called a "NodeB" or an enhanced Node B "eNodeB." Each base station typically serves several cells. One common deployment is 3-cell base station installations, where a base station serves three cells. A radio terminal is primarily served by a serving base station in a serving cell in which the radio terminal resides. In some technologies, communication links are not only established between a particular radio terminal and its serving cell, but also between the radio terminal and other cells. In this case, the terminal is served by multiple base stations using what is referred to as macro diversity or soft handover.

A base station sends signals to and receives signals from radio terminals. The signals may either be dedicated signals to and from specific radio terminals, multicast signals intended for a subset of the radio terminals in a cell, or broadcast signals from the base station to all radio terminals in a cell. A base station broadcasts information to all the radio terminals in a cell using the broadcast channel of the serving cell.

Small scale base stations have recently been introduced that are connected to broadband internet service and provide coverage for very small areas sometimes called femto cells. Femto cells are similar to WiFi "hotspots" but are part of a cellular network rather than a wireless local area network (WLAN). The femto base stations work in many ways like a larger "macro" base station would, but on a much smaller scale with low output power designed for small spaces such as apartments, houses, offices, etc. Pico is another name for these small base stations meaning "small," and in this case, "femto" means even smaller. Femto base stations provide a better signal in smaller interior or closed spaces where signal quality between regular macro base stations and mobile phones is poor due to the proximity of macro base station towers or just due to the material of the building or other obstructions blocking the signal. Instead of using a traditional base station, the mobile terminal uses the femto base station to gain access to the IP network.

FIG. 1 shows an example of a cellular communications system that includes a small scale base station and a traditional macro base station. A first building 1 includes a radio terminal 2 that receives radio signals from a macro base station 3. The macro base station 3 is coupled to a core network 5 either directly or through a radio access network 4. The core network 5 provides access to the Internet 6 and other networks. A second building 7 includes another radio terminal 8 that receives radio signals from a small scale base station 9. The small scale base station 9 may be coupled, typically via some broadband access mechanism (wired or wireless), to the core network 5 either directly or through a radio access network 4. Again, the core network 5 provides access to the Internet 6 and other networks. Because the small scale base station is located inside the building 7 and is typically only intended to provide coverage within and in close proximity to the building 7, its transmit power can be considerably lower than that of the macro base station 3, which has a much larger and varied coverage area, while still providing high data rate service.

Small scale base stations usually serve small cell areas that have a restricted group of users such that only users in that group can receive service from the small scale base station. Often, a customer may buy a small scale base station in a retail store and install it by connecting it to a power outlet and the data network in a home, office, school, etc. These small scale base stations are sometimes called home base stations, femto base stations, pico base stations, etc. A larger scale macro base station may also only allow access and provides service to a restricted group of users, but a small scale base station is the more typical example. For this application, any base station that only allows access and provide service to a restricted group of users is referred to as a closed subscriber group (CSG) base station. A CSG base station serves one or several CSG cells which only permit access to a restricted set of radio terminals. A CSG cell may also be used to compile networks with restricted access, e.g., to support corporate networks. A base station that is not so closed or restricted in this way is referred to as an "open" base station.

Current cellular radio systems include for example Third Generation (3G) Universal Mobile Telecommunications System (UMTS) operating using Wideband Code Division Multiple Access (WCDMA) and Fourth generation (4G) systems, like the Long Term Evolution (LTE) of UMTS operating using Orthogonal Frequency Division Multiple Access (OFDMA). One important focus area in the LTE and System Architecture Evolution (SAE) standardization work is to ensure that the new network is simple to deploy and cost efficient to operate. The vision is that the new system will be self-optimizing and self-configuring in as many aspects as possible. One such aspect is automatic incorporation and handling of closed subscriber group cells (CSG cells) on the same frequency band as the traditional macro cell layer with essentially no configuration.

A CSG base station installation may be motivated by various expectations and presents various issues. For example, an end-user connected to his/her CSG base station hopes to achieve a higher price/performance ratio as compared to the macro network while still receiving the same services as when connected to a macro base station. The user may also expect higher data rates and better service quality than when camping on a macro cell. Another expectation is easy and essentially automatic installation procedure of the CSG base station which includes support of handovers to/from the CSG base station for authorized users without extensive manual configuration. One issue arises from a CSG base station possibly having lower call management capabilities than a macro base station, and therefore, the CSG base station may be less proficient at performing admission and authorization functions. If so, many non-authorized handover requests to the CSG base station, and subsequent handover rejections in response thereto, will hamper the performance of the CSG base station. Another issue is the desirability of convenient addition of new users who are authorized to use the CSG base station. Furthermore, it is beneficial if operators can sell a CSG base station where all users with a particular subscription with the same operator are authorized to use any, or a subset, of the CSG base stations.

Handovers in LTE and WCDMA are mobile-assisted, which means that the radio terminal reports to its serving base station measurements the radio terminal has made of the quality (e.g., signal strength) of signals received from the serving base station and from other cell alternatives associated with handover "candidate" base stations. The other cell alternatives are identified using cell identifiers. Non-limiting examples of such physical identifiers are the downlink scrambling code number of the cell in WCDMA and the physical cell identifier in LTE describing a reference signal waveform of the cell. The radio terminal may either report another cell also served by the same base station (assuming the base station serves multiple cells) or another cell served by a different base station.

A neighbor cell relation (NCR) list is a list associated with a cell listing relevant (e.g., neighboring) candidate cells for handover. For each candidate cell, the list information includes: cell identifiers including both physical cell identities and globally-unique cell identities, connectivity information, e.g., how a communication link can be established between the serving base station and the candidate cell's base station, and cell type information, e.g., CSG cell, macro cell, micro cell, etc. The neighbor cell relation list may be stored in the base station, but it may also be stored in other nodes, possibly with regular updating of the NCR lists in multiple nodes.

A radio terminal's measurement report transmission is typically triggered, i.e., event-triggered, event-triggered periodic, or periodic. For event-triggered reporting, the radio terminal sends a report to its serving base station when a configured criterion is met. One example of such a criterion is that the quality of a new cell is measured during a predefined time within a range between the serving cell and a predetermined offset. The predetermined time and offset are provided by the serving base station to the radio terminal. Another example of such a criterion is that a cell that previously was within a range between the serving cell and a predefined offset moves outside the range for a predefined time. Event-triggered reporting results in one measurement report upon triggering of an event. For event-triggered periodic reporting, the radio terminal continues to send measurement reports periodically after triggering of an event—either for a pre-defined number of periods, or until a different triggering condition is met. For periodic reporting, the radio terminal regularly reports measurements. This was typically the case for second generation systems such as GSM.

The radio terminal typically considers all cells when investigating whether a triggering event is met. On the other hand, it is preferred that the radio terminal does not consider and report alternative cells that are somehow indicated as forbidden for access. One way to communicate the forbidden status of multiple cells is for the serving base station to broadcast a black-list of cells on the serving cell's broadcast channel (i.e., the serving cell broadcasts a black list of cell identifiers). Another way is for the radio terminal to only report cells included in a "white" list broadcast by the serving base station on the serving cell's broadcast channel. The white list can be seen as an inverse black list. If there are many cells on the black list, it may be more efficient to signal the white list or vice versa. A third way is for each base station serving a prohibited cell to broadcast a message over its broadcast channel that indicates that the prohibited cell is forbidden for access. All radio terminals should check this indication before reporting a cell. Examples of such indicators are "Cell Barred," "Cell Restricted," or "CSG Cell."

If a CSG base station is deployed as a typical "open" base station, then the CSG base station will likely process many handover requests for non-authorized radio terminals that are not part of the CSG, and as a result, must also reject these requests. This generates a significant and unnecessary processing load for the CSG base station. So there are a variety of problems with handover-related signaling and CSG cells.

But there are also problems with radio terminals not reporting handover measurements for CSG cells. One is how to initialize a newly-deployed CSG cell since it may not be considered as an allowed candidate cell by the radio terminal. Another problem is that a CSG cell's base station may be turned-off during long periods of time, especially if the CSG base station is used in a private home. The network's status may have changed since that CSG cell was active, e.g., the local base station identifiers may have been reallocated or modified, which means that neighbor cell relation information has changed. Also, a CSG cell may have been moved since it was powered on the last time. For example, a CSG cell may have been moved to an office, another business site like a conference facility or client site, or another home. The previous neighbor cell relation information for such a CSG cell may be of little value because the CSG cell's prior neighbors are likely no longer neighbors.

SUMMARY

Neighbor cell relation lists are initialized and managed in a number of ways that are especially beneficial to closed subscriber group (CSG) cells served by CSG base stations. (Only radio terminals belonging to the CSG are permitted to access and receive service from the CSG cell.) Information is provided to radio terminals in the cells neighboring the CSG cell that generally indicates that radio terminals are not to report to their respective serving base stations signal quality measurements of a signal received from the CSG base station unless the radio terminal is instructed by its serving base station to consider the CSG cell in the measurement report triggering. When a CSG cell powers-up, it is determined whether the CSG cell has previously been powered-on in a same environment. If so, the neighbor cell relation information for the CSG cell is updated with other network node(s). If not, the neighbor cell relation lists of the CSG cell are initialized.

The environment is a network environment that affects neighbor cell relations. For example, a change in a location of the CSG cell since it was last powered-on is a change in the environment. Another example environmental change is a change of neighbor cell relation information for multiple cells in the cell network since a last time that the CSG cell was powered-on. Even if the CSG cell is in the same location, other neighboring cells may have moved, changed connectivity information, or changed their cell identities. During the updating procedure, it may be discovered that the powered-up cell's neighbor cell relation list information has changed sufficiently to conclude that an environment change has occurred.

A CSG cell is initialized as follows. First, radio terminals are informed by their serving base station that if they receive a signal transmitted by the CSG base station at or above a predetermined signal quality, or if the received signal quality of a signal transmitted by the CSG base station is higher than the signal quality of a signal transmitted by the serving base station by a predetermined amount, then the radio terminals may report signal quality measurements for the CSG cell to their respective serving cells, even though the radio terminals have been instructed not to report the CSG cell. Then, when a predetermined number of neighbor cells are included in a neighbor cell list for the CSG cell, the radio terminals are informed that only those radio terminals in the closed subscriber group of the CSG cell may report signal quality measurements for the CSG cell to their respective serving cells, regardless of how good the received signal quality is from the CSG base station. The steps may be performed by the serving base station, the CSG base station, or by a network node coupled to the CSG base station. Moreover, if an idle one of the radio terminals determines that a signal quality measurement for the CSG cell exceeds a signal quality measurement for a non-CSG cell, that terminal may attempt to register with the CSG cell.

The serving cell may adjust the predetermined thresholds and predetermined amounts described above based on observed measurement reports from served radio terminals, e.g., a number of CSG cells reported by unauthorized radio terminals that the serving base station already has listed in its neighbor cell relation list.

A network node includes a memory for storing a neighbor cell relation list for each cell having an associated base station and a controller. When a controller in the network node determines that the cell recently powered-up for operation, it identifies a first cell that is a neighboring cell to the powered-up cell based on neighbor cell relation list information stored in the memory. The controller then adds one or more neighbor cell relations associated with the first cell as neighbor cell relations associated with the powered-up cell until a predetermined number of neighbor cells are included in a neighbor cell list for the powered-up cell. In one non-limiting example embodiment, the base stations include open base stations associated with open access cells and a closed subscriber group (CSG) base station serving a CSG cell in which only radio terminals belonging to the CSG are permitted to access and receive service from the CSG cell. In this example, the powered-up cell is the CSG cell, and the memory in the network node stores (i) a neighbor cell relation list for each open cell, (ii) a neighbor cell relation list for each CSG cell, and (iii) a CSG authorization list which, for each of multiple radio terminals, identifies all CSG cells that the radio terminal is authorized to access and receive service from. The network node may be a central node coupled to the open and closed base stations via one or more suitable interfaces. One example of a central node is the operations support system (OSS).

A base station includes a controller and a memory for storing a neighbor cell relation list for each served cell. When a controller in the base station determines that one served cell recently powered-up for operation, it identifies a first cell that is a neighboring cell to the powered-up cell based on neighbor cell relation list information stored in the memory. The controller in the base station queries the first base station serving the first cell about the neighbor cell relation list of the first cell, and then adds one or more neighbor cell relations associated with the first cell as neighbor cell relations associated with the powered-up cell until a predetermined number of neighbor cells are included in a neighbor cell list for the powered-up cell. In one non-limiting example embodiment, the base stations include open base stations associated with open access cells and a closed subscriber group (CSG) base station serving a CSG cell in which only radio terminals belonging to the CSG are permitted to access and receive service from the CSG cell. In this example, the powered-up cell is the CSG cell, and the memory in the CSG base station stores a neighbor cell relation list for each CSG cell.

A radio terminal receiving signals transmitted by neighboring base stations associated with neighboring cells determines an associated signal quality and identifies those that exceed a predetermined signal quality threshold. A determination is made whether the signal quality measurement of a restricted access base station supervising a restricted access cell exceeds signal quality measurements associated with non-restricted access base stations by a predetermined amount. If so, the terminal sends a registration request to the restricted access base station. If the signal quality measurement corresponding to the CSG cell does not exceed signal quality measurements corresponding to non-CSG cells by the predetermined amount, the radio terminal sends a registration request to one of the non-CSG cells whose associated a signal quality measurement exceeds the predetermined signal quality threshold.

BRIEF DESCRIPTION OF THE DRAWINGS

FIG. 7 is a flow chart diagram illustrating non-limiting, example procedures for a CSG cell that has powered-on;

FIG. 8 is a flow chart diagram illustrating non-limiting, example procedures for quickly building up neighbor cell relations for a CSG cell that has powered-on;

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs).

Figure 1:
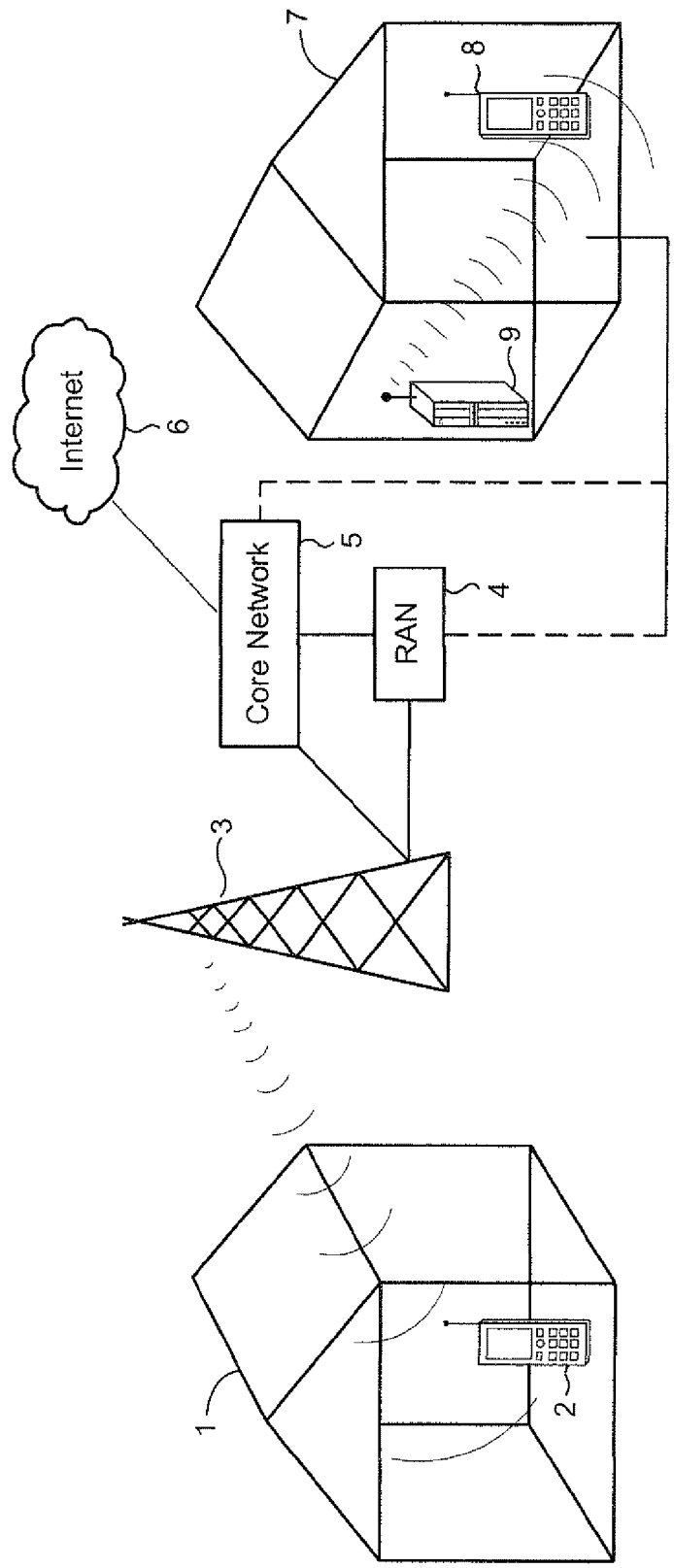
FIG. 1 illustrates a macro base station and a small scale base station in a cellular communications system.
Figure 2:
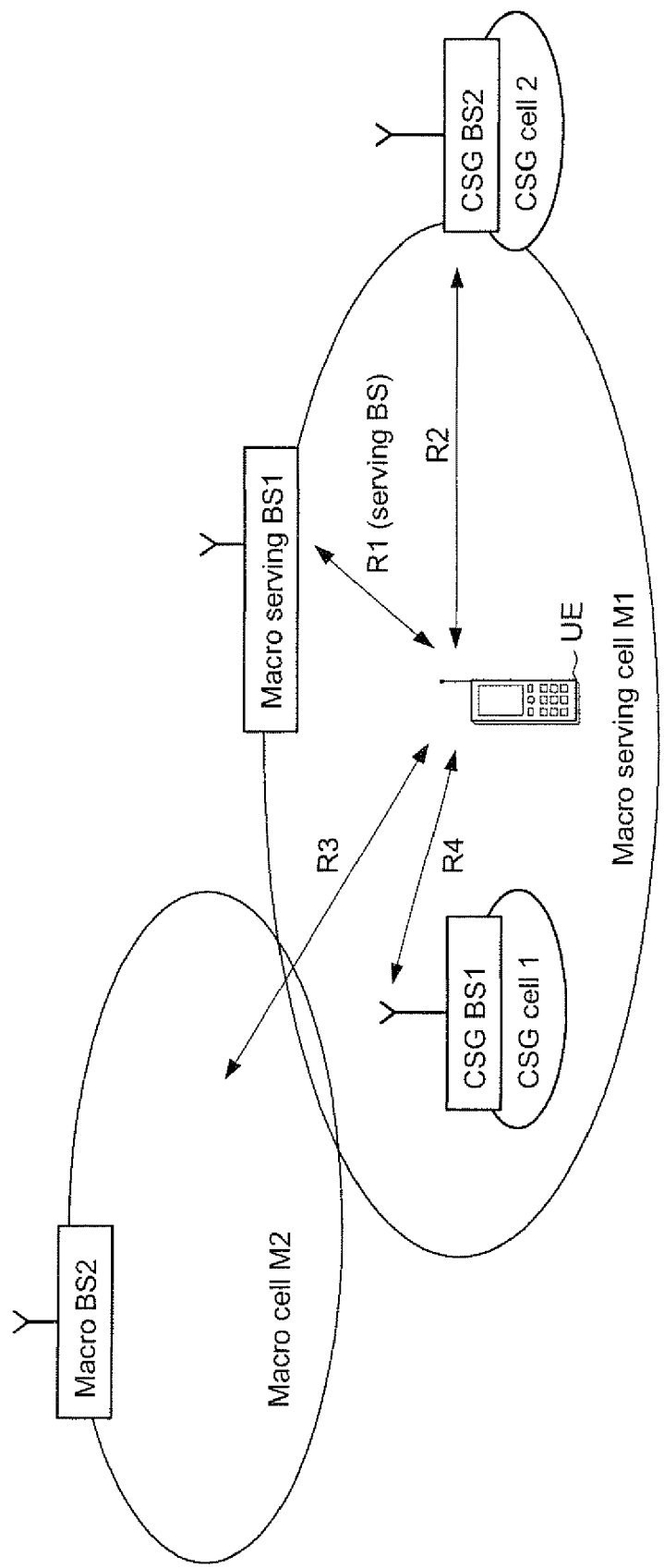
FIG. 2 illustrates a cellular communications system with macro and CSG cells and base stations.

FIG. 2 conceptually illustrates a cellular communications system with macro and CSG cells and base stations. Two adjacent macro cells M1 and M2 are shown in this simplified example with corresponding macro base stations Macro BS1 and Macro BS2. Within macro cell M1 is a CSG cell 1 with its associated CSG base station CSG BS1. Adjacent to the macro cell M1 is a second CSG cell 2 with its associated CSG base station CSG BS2. Broadcast radio signals shown as R1-R4 are shown reaching a UE/radio terminal from each of these base stations. The macro BS1 is assumed to be the base station currently serving the radio terminal, and the radio terminal has the ability to send received signal quality measurement reports to the serving base station Macro BS1 for Macro BS2, CSG BS1, and CSG BS2. If the radio terminal moves closer to CSG cell 1 or CSG cell 2, then there is an opportunity for handover to one of these CSG cells depending on whether the radio terminal is a member of the CSG for that cell.

Figure 3:
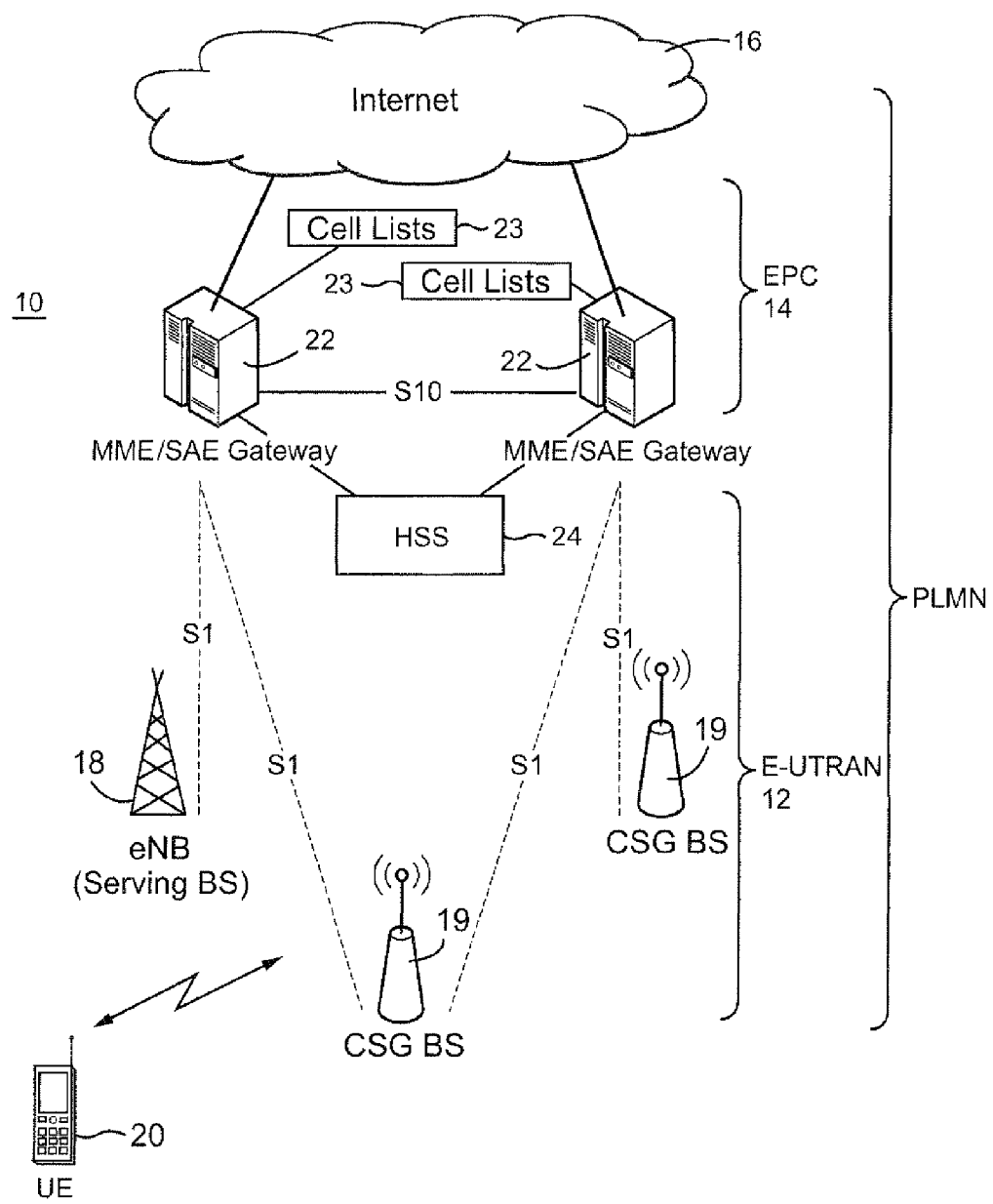
FIG. 3 is a function block diagram of an example LTE mobile radio communication system including macro and CSG base stations.

The technology in this application is well-suited for, and therefore sometimes described in the context of, an LTE system in order to provide an example and non-limiting context for explanation. But this technology may be used in any modern cellular communications system and is not limited to LTE, e.g., WCDMA, etc. FIG. 3 illustrates an example of an LTE type mobile communications system 10. An E-UTRAN 12 includes E-UTRAN NodeBs (eNodeBs) 18 (only one is shown) that provide E-UTRA user plane and control plane protocol terminations towards a user equipment (UE) terminal 20 over a radio interface. Also shown are two CSG base stations 19. The base stations 18 and 19 are communicate via an S1 interface to an Evolved Packet Core (EPC) 14 which includes a Mobility Management Entity (MME) and to a System Architecture Evolution (SAE) Gateway. The MME/SAE Gateway is shown as a single node 22 in this example and is analogous in many ways to an SGSN/GGSN gateway in UMTS and in GSM/EDGE. But the MME and SAE may be separate nodes. The MME/SAE gateways may communicate via an S10 interface. The MME/SAE may include a memory 23 for storing cells lists for the base stations including for example neighbor cell relation (NCR) lists, black and/or white cell lists, etc. The E-UTRAN 12 and EPC 14 together form a Public Land Mobile Network (PLMN). The MMEs/SAE Gateways 22 are connected to directly or indirectly to the Internet 16 and to other networks. The base stations 18 and 19 may communicate with the Home Subscriber Server (HSS) including HLR and/or VLR databases 24 possibly via the MME/SAE 22.

Radio networks often use non-unique physical identifiers of base stations/cells (referred to as local identifiers below) to support efficient radio terminal UE measurement reporting procedures. But base stations/cells also have globally unique cell identities. For the LTE example embodiment described, it is assumed that there is a unique identifier for each cell referred to as a Cell Global Identifier (CGI) and a physical layer 1 identifier/local identifier for the same cell called a Physical Cell Identity (PCI) that is not long enough to be unique for each cell in the PLMN. The shorter PCIs are used in measurement reporting to conserve bandwidth. In LTE, a current example assumption is to have 504 unique PCI values.

For received signal quality measurements, the radio terminals monitor received base station broadcast reference symbols to measure the base station's reference symbol received power (RSRP). These measurements are used when performing initial cell selection as well as handovers. It is thus important from each radio terminal's perspective that there is a local one-to-one mapping between the PCIs the radio terminal can detect and the CGIs. This means that when a radio terminal reports a PCI to its serving base station, the serving base station can associate the reported PCI to an entry in the serving cell neighbor cell relation list if a cell relation is established. In a WCDMA system, the PCI may correspond to a "scrambling code" where in one example there may be 512 different scrambling codes. PCI values are assigned to the cells in the network as part of the initial configuration procedure of a cell. These PCI values may be reconsidered and reassigned or changed over time. One strategy can be to divide the set of PCIs into subsets, (e.g., different PCI value ranges), and reserve each subset to a specific cell type. As one non-limiting example, CSG cells may be assigned PCIs from the range 1-20.

In the systems shown in FIGS. 2 and 3 and in other similar kinds of systems, technology is now described that reduces the resources associated with radio terminals searching for their own CSG cell and limits unnecessary CSG cell measurements and reporting unless the radio terminal is authorized. This improves the performance of the overall network. Radio terminals are supported during handover from a BS to a CSG cell while at the same time the negative impact from having all radio terminals in the network perform measurement and reporting on unauthorized CSG cells is substantially reduced.

In one non-limiting example embodiment, all CSG base stations broadcast an indicator over the CSG cell's broadcast channel that indicates that a CSG cell has restricted access limited only to a CSG. Examples of such indicators are a barred cell, a restricted cell, or a CSG cell. The indicator implements a general rule that radio terminals should not report the signal quality of broadcast signals received from CSG cells that include such an indicator in the broadcast channel unless specific instructions are sent to the radio terminal from the serving base station instructing the radio terminal to consider signal quality measurements associated with a particular CSG cell in the measurement report triggering. In another non-limiting example embodiment, the serving base station broadcasts a "black list" over the serving cell's broadcast channel including the physical cell identities (e.g., PCIs in LTE) of all CSG cells registered as neighbor cells to the serving cell. This prevents reporting of measurements from CSG cells from unauthorized radio terminals. Other techniques for communicating a similar type of message to radio terminals are possible.

The serving base station may send, when desired, a message to one or more radio terminals informing them that they should consider measurements related to a specific CSG cell in measurement report triggering even though the CSG base station serving that CSG cell broadcasts an indicator over that CSG cell's broadcast channel that indicates that a CSG cell has restricted access to a CSG or the CSG cell is identified on a "black list" broadcast by the serving base station over the serving cell broadcast channel or otherwise identified as a forbidden cell. Examples of such indicators are a barred cell, a restricted cell, or a CSG cell. Furthermore, a "black list" may also be signaled in a dedicated fashion to individual radio terminals.

This forbidden cell information used in black lists may be obtained by the base station when a radio terminal connects to a cell served by the base station, e.g., after a successful handover to or radio terminal registration with the cell. At that time, the serving base station checks with a central node (e.g., the MME in LTE or the SGSN in WCDMA, a subscriber and subscription information database such as the HSS, or some other node that maintains radio terminal context information) to determine whether the radio terminal is authorized to access any CSG cells that are neighbors to the macro base station. The central node signals to the serving base station a list of these neighboring CSG cells. The serving base station then sends an instruction to the radio terminal if it is authorized to access one or more CSG cells on the serving base station's neighbor cell relation (NCR) list requesting the radio terminal to consider those listed and authorized CSG cells in the measurement report triggering, even though the CSG base stations serving those CSG cells broadcast an indicator over those CSG cell's broadcast channel that indicates that those CSG cell have restricted access to a CSG, or those CSG cells are identified on a "black list." The serving base station may update the black list by sending a new "black list" to the radio terminal replacing any prior black list. In this way, only authorized radio terminals consider CSG cells as a "candidate cell" in the measurement report triggering. Unauthorized radio terminals do not consider CSG cells in the measurement report triggering.

The forbidden cell information used in black lists may also be obtained by the base station from a central node such as the HSS during radio terminal registration, Then, this forbidden cell information may be passed on to a next target base station during handover, e.g., using a message "container" in which information associated to the radio terminal can be transferred from one serving base station to the next target base station during handover.

One example method for compiling neighbor cell relation lists is described in commonly-assigned PCT application no. PCT/EP2007/001737, entitled "Self Configuring and Optimisation of Cell Neighbours in Wireless Telecommunications Networks," filed on Feb. 28, 2007, the disclosure of which is incorporated herein by reference. The associative information between a CSG cell and authorized radio terminals stored in the central node may be accessed and modified via a user interface by the operator, the owner of the CSG cell, etc. The serving base station preferably processes radio terminal measurement reports and conducts handover procedures independent of whether they pertain to a CSG cell or another macro cell. But handover procedures tailored to the type of target cell, e.g. a CSG cell, may be used.

When the radio terminal performs cell selection without macro or open cell coverage, the radio terminal may—contrary to the general rule when there is macro or open cell coverage—consider as cell connection candidates restricted, forbidden, or black-listed cells. The radio terminal may also keep track of its own CSG cell identifier value (e.g., CGI or PCI) to first try to connect with its own CSG cell. If that fails, then the radio terminal tries to connect to other CSG cells it can detect, since other CSG cells may be authorized that the radio terminal is unaware of. In the LTE context, the current Non-Access Stratum (NAS) protocol between a core network node and the radio terminal, may be extended to inform the radio terminal about the current PCI or CGI values of the CSG cells it is authorized to connect to. Another example alternative is to send a short message service (SMS) or a multimedia message service (MMS) message or similar to the radio terminal containing this information.

Figure 4:
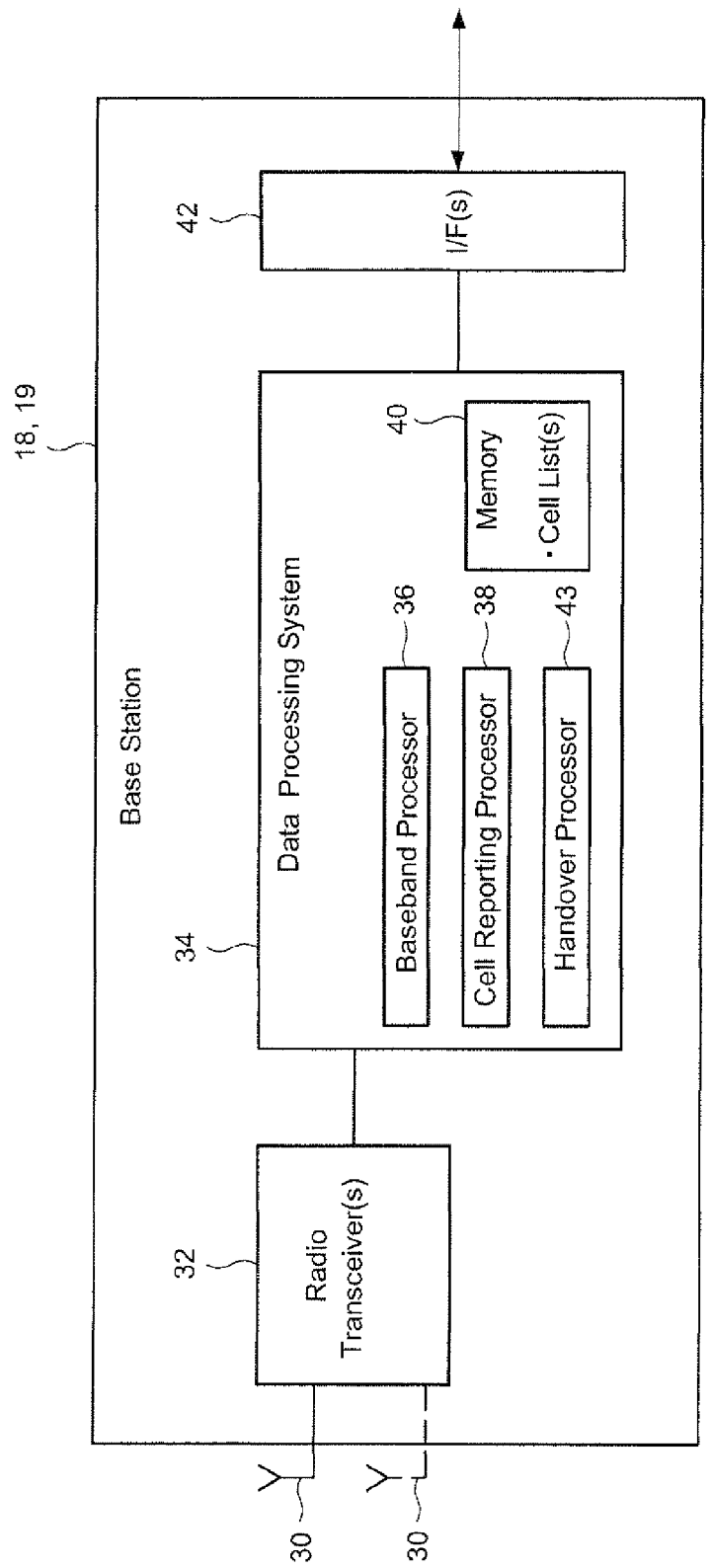
FIG. 4 is a non-limiting, example function block diagram of a base station.

FIG. 4 is a non-limiting, example function block diagram of a base station which may be either an open base station 18 or a CSG base station 19. The base station 18, 19 includes one or more radio transceivers 32 coupled to one or more antennas 30 for communicating over the radio interface with radio terminals. The radio transceiver(s) 32 connect to a data processing system 34 which includes a baseband processor 36 that performs baseband processing on the information to be transmitted via the radio transceiver(s) 32 and on signals received from the radio transceiver(s) 32. The data processing system 34 also includes a cell reporting processor 38 which receives from the transceiver(s) 32 radio signal quality measurements and possibly scanned broadcast information from served radio terminals as well as radio terminals initiating access in a cell selection procedure for use in handover and cell selection operations as well as in generating neighbor cell relation lists. A neighbor cell relation list is stored in a memory 40. The base station communicates with other network entities via one or more interfaces 42. The cell reporting processor 38 may perform processing related to NCR list updating and initializing.

In an example where FIG. 4 is a CSG base station, the CSG base station may include a software-based (e.g., a web server inside the CSG cell or a small LCD user interface) and/or hardware-based (e.g., switch or knob attached to the CSG base station unit) mechanism that allows the owner or operator of the CSG base station to send a message (e.g., via the interface 42) from the CSG base station to a central node informing the central node that the CSG base station is in a new environment. The interaction may also inhibit/enable signaling or a message in the CSG cell indicating whether the CSG cell is forbidden, i.e., radio terminals should not/should report measurements for the CSG cell to their serving base stations.

Authorization of radio terminals is based on signaling via interface 42. Furthermore, the discovery of a new neighbor cell is followed by communication over interface 42 in order to establish connectivity information to the base station serving the new cell, as well as other information about the cell, e.g., cell type. When a candidate cell is reported, the cell reporting processor 38 may continue to monitor the candidate cell by receiving measurements from the transceiver 32. The measurements associated to the candidate cell are sent to a handover processor 43, which determines whether and when a handover is considered beneficial. When the handover processor 43 has determined to proceed with a handover, the handover procedure is performed via signaling with the radio terminal using the transceiver 32, with the next serving base station via one of the interfaces 42, and to a core network node via one of the interfaces 42.

Figure 5:
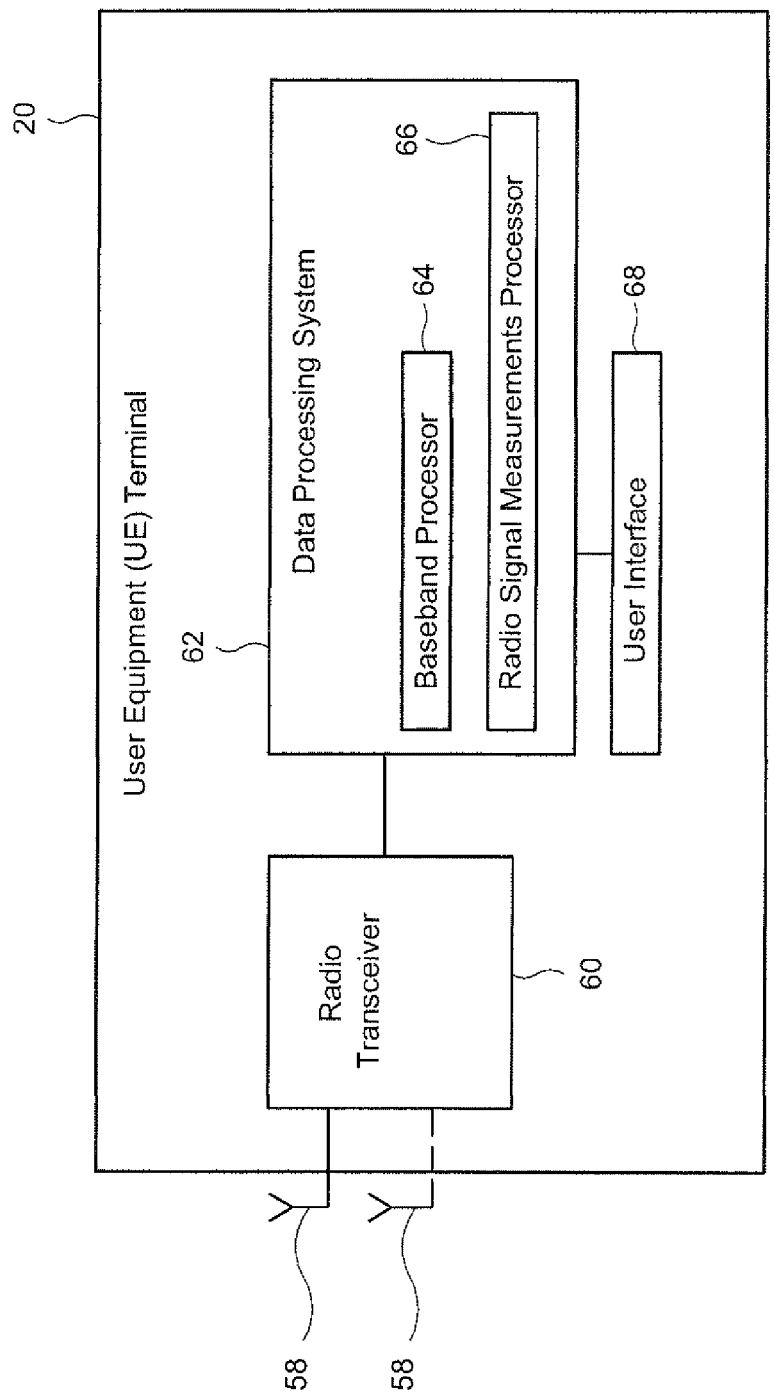
FIG. 5 is a non-limiting, example function block diagram of a radio terminal.

FIG. 5 is a non-limiting, example function block diagram of a radio terminal. The radio terminal 20 includes a radio transceiver 60 coupled to one or more antennas 58 for communicating over the radio interface with base stations. The radio transceiver 60 connects to a data processing system 62 that includes a baseband processor 64 that performs baseband processing on the information to be transmitted via the radio transceiver 60 and on signals received from the radio transceiver 60. The data processing system 62 also includes a radio signal measurements processor 66 that controls the transceiver 60 to measure (and possibly filter) radio signal quality, scan broadcast signals and information contained in those signals from neighboring base stations including CSG base stations, and perform measurement report triggering by evaluating one or more conditions configured by the serving base station. When a triggering condition is met, the measurement processor sends measurement reports to a serving base station. As explained above, in the measurement report triggering, the measurements processor 66 considers all cells except CSG cells that are restricted and that the serving base station has not instructed the radio terminal to specifically consider, even though they are restricted. The radio terminal 20 also includes a user interface 68 to permit a user to program the radio terminal and communicate with the radio terminal.

Figure 6:
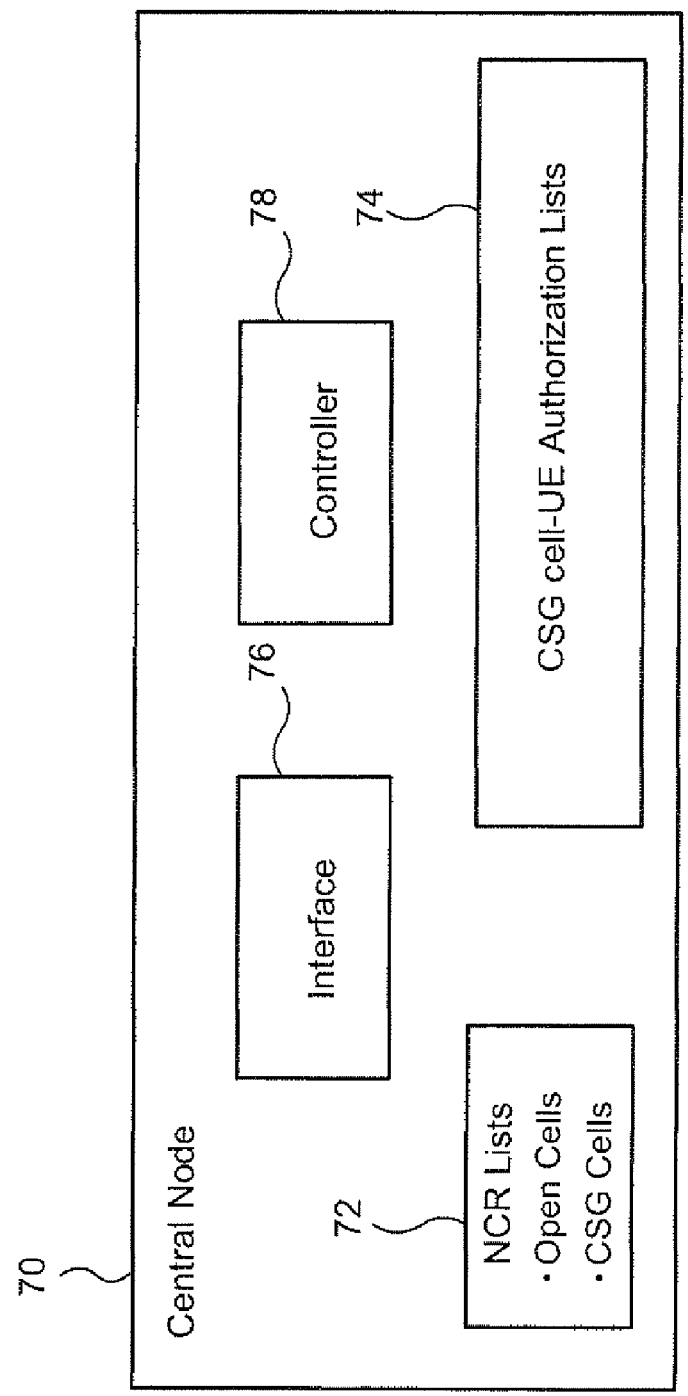
FIG. 6 is a non-limiting, example function block diagram of a central node storing cell lists.

FIG. 6 is a non-limiting, example function block diagram of a central node 70. The central node 70 includes a controller 78 for performing supervisory, data processing, and control functions and communicates with other network nodes via an appropriate interface 76. A memory such as a database is provided for storing CSG cell—radio terminal authorization lists 74 and neighbor cell relation lists 72 for various cells (both open and CSG cells) in the network and other lists. The CSG cell—radio terminal authorization lists 74 are updated via the interface 76, possibly by updating the lists with information in another central node. A radio terminal's identifier (e.g., IMSI) may be added/replaced/removed from a CSG cell—radio terminal authorization list 74 either by the network operator or by the owner of the CSG base station. This can be done for example via an operator web interface using phone numbers as identifiers which then are converted to radio terminal IMSIs. The neighbor cell relation list of one cell can be updated by comparing lists with the base station serving the one cell.

Figure 7:
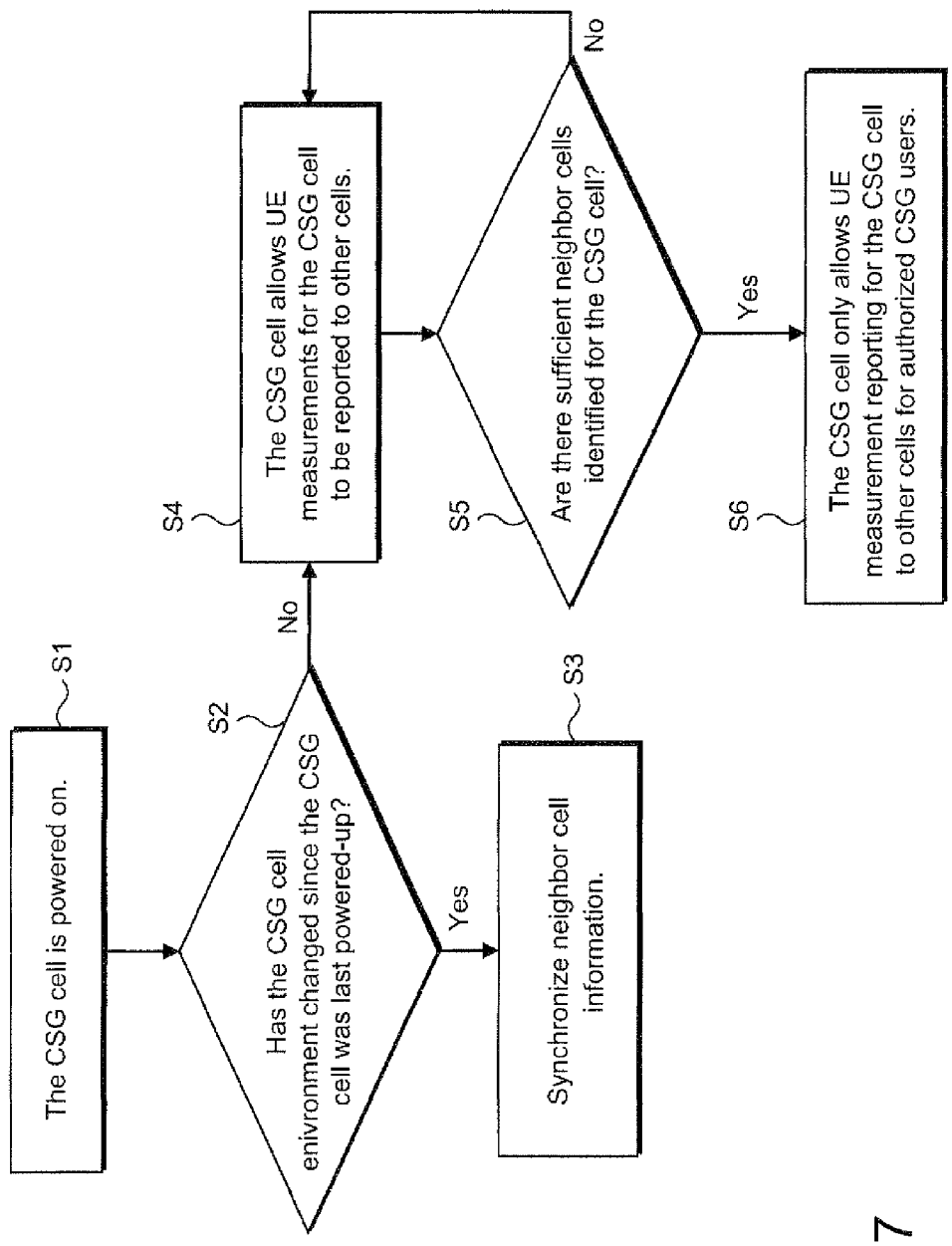

FIG. 7 is a flow chart diagram illustrating non-limiting, example procedures for a CSG cell that has powered-on. When a CSG cell powers-on (step S1), it establishes a connection with the central node 70, and as part of the connection procedure, the central node 70 is informed about the CSG connectivity information, e.g., the CSG cell's IP-address. A determination is made in step S2, e.g., by the CSG cell's base station checking with the central node 70, whether the CSG cell is in the same network environment that it was when it was last powered-up. The environment is a network environment that affects neighbor cell relations. For example, a change in a location of the CSG cell since it was last powered-on is a change in the environment. When a cell is powered on after being powered off for some time, it may need to re-establish both user plane and control plane connectivity. This procedure can be quite similar to the initial configuration of a newly-deployed cell. As part of this procedure, a central node can detect location information concerning the CSG cell. It can be the CSG cell's IP address, sub-network information, internet service provider, and/or location information that the cell reports, possibly entered by the cell owner of installer. Another example environmental change is a change of neighbor cell relation information for multiple cells in the cell network since a last time that the CSG cell was powered-on. Even if the CSG cell is in the same location, other neighboring cells may have moved, changed connectivity information, or changed their cell identities. During the updating procedure, it may be discovered that the powered-up cell's neighbor cell relation list information has change sufficiently to conclude that an environment change has occurred. As explained above, the CSG base station may provide a mechanism that allows the CSG base station owner or operator to send a signal to the central node indicating that the CSG base station is in a new environment.

If the environment is the same, then the neighbor cell relation list information for the CSG cell is updated with the central node 70 (step S3). The updating may include for example updating current information neighboring cells in the CSG cell's NCR list such as changed cell identity, changed cell IP address, etc. A neighbor cell relation list of a powered-on "first" cell includes information about handover candidate cells, e.g., a candidate cell's PCI, CGI, and connectivity (to other base stations and/or the central node) information. Since the last time the first cell was powered-on, it may be that the PCIs of other cells have changed, some cells may have been de-installed or moved, and as a result, their connectivity information altered. If the updating procedure determines that extensive information has been altered, an environment change may be assumed, and the cell is instead initialized.

If connectivity with a second cell in the neighbor cell relation list of the first cell is maintained, it is possible for the first cell to query the current status of the second cell. Using the neighbor cell relation list of the second cell, the first cell updates its neighbor cell relation list information about the second cell. Assuming that cell relation information is stored in the central node 70, an alternative updating method is for the first cell to update the cell relation information about the second cells in its neighbor cell relation list using the current cell information for those second cells from the NCR lists stored in the memory of the central node 70. Furthermore, the first cell may consider adding cells from the neighbor cell relation list of the second cell to the to its own neighbor cell relation list. This can be considered for all second cells in the neighbor cell list of the first cell or restricted to the second cells with the highest number of handovers in the past.

If the environment is not the same, then there is a need to establish neighbor cell relations between the CSG cell and other cells. Moreover, the CSG cell may randomize a new physical cell identity. The CSG cell initially allows radio terminal measurements for the CSG cell to be reported to other cells for example by not indicating that it is forbidden ("cell barred", "cell restricted", "CSG cell", or similar) for some period of time after the cell powers-up, e.g., the number of cell relations in the CSG cell exceeds a threshold, a timer expires, etc. (step S4). The CSG cell may also broadcast an initialization flag that allows the radio terminals to report the CSG cell to any other cell at least once. This initialization flag could also indicate to the radio terminal that it should detect the global identifier (e.g., CGI) of the CSG cell and report the global identifier along with the signal quality measurement to its serving cell to avoid ambiguities. Again, the CSG base station may include a mechanism that allows the CSG base station owner or operator to change the access restriction property of the CSG cell either via hardware or software. A determination is then made whether there are sufficient neighbor cells identified for the CSG cell (step S5). If not, the radio terminal measurements for the CSG cell continue to be reported to other cells in step S4. If so, the CSG cell thereafter only allows radio terminal measurement reporting for the CSG cell to other cells by authorized CSG radio terminals (step S6).

In the initializing process, establishing neighbor cell relation lists can be performed in a variety of ways. The three example mechanisms described below may be used separately or in combination: fast neighbor cell relation build up, initial authorization of measurements to be reported from any mobile, and specific radio terminal selection procedure at radio terminal power-up. The first mechanism may be used for any type of cell, while the second and third mechanisms are more typical for CSG cells.

Figure 8:
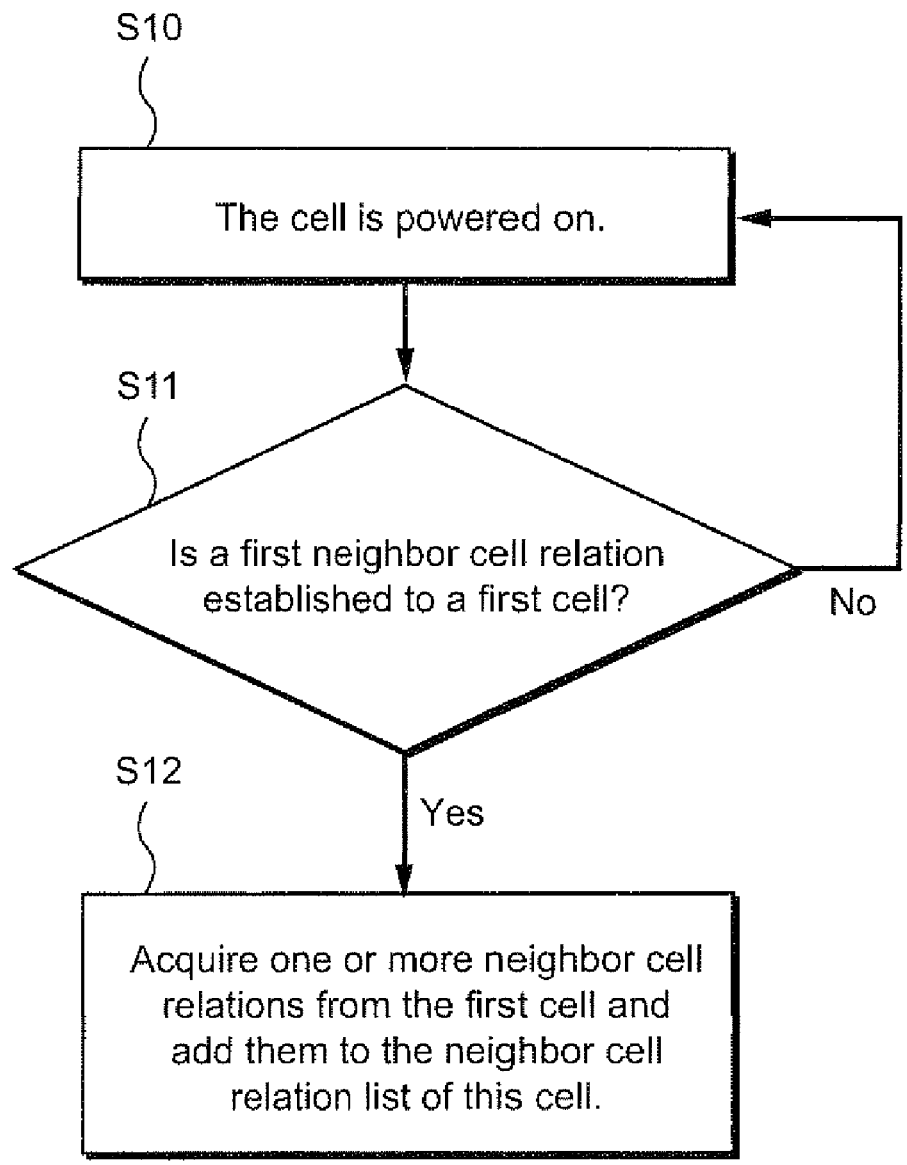

FIG. 8 is a flow chart diagram illustrating non-limiting, example procedures for quickly building up neighbor cell relations for a cell that has powered-on. After the cell is powered on (step S10), a decision is made by the powered-up cell's base station, i.e., referred to as the first base station/cell, whether a first neighbor cell relation list exists with neighbor cell entries (step S11). If not, the first powered-up cell's neighbor cell relation list is empty. Accordingly, the first cell's base station acquires from a second neighboring cell's base station or from the central node one or more neighbor cell relations that already exist for the second neighboring cell (step S12). Preferably, though not necessarily, all the entries of the second cell neighbor cell list are copied into the neighbor cell relation list of the first cell. However, because the base station connectivity information likely differs between the first and second base stations, the first base station needs to verify connectivity with each listed neighbor cell. Furthermore, all cell relations may be mutual so that the first cell appears as a neighbor cell to all the cells in the neighbor cell relation list of the second cell. This procedure may be repeated either with one or more other cells from the neighbor cell relation list of the second cell or via any subsequently measured and UE reported neighbor cells.

Figure 9:
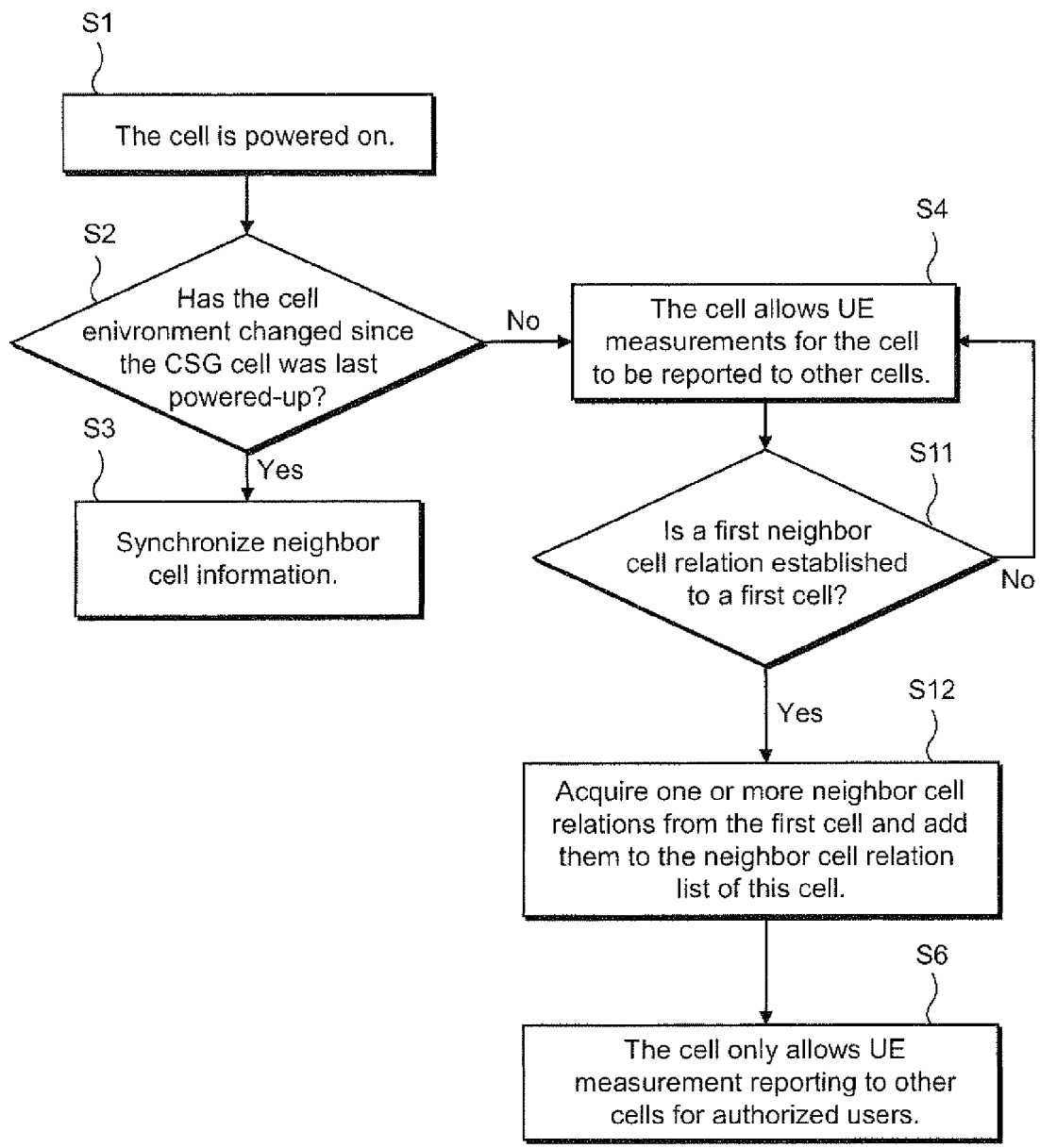
FIG. 9 is a flow chart diagram illustrating non-limiting, example procedures for quickly building up neighbor cell relations for a CSG cell that has powered-on coupled with initial temporary UE measurement reporting for the CSG cell.

FIG. 9 is a flow chart diagram illustrating non-limiting, example procedures for quickly building up neighbor cell relations for a CSG cell that has powered-on coupled with initial temporary UE measurement reporting for the CSG cell. Steps S1-S4 are the same as in FIG. 7. After step S4, steps S11 and S12 are performed as described in FIG. 8. After there are sufficient neighbor cells identified for the CSG cell, the CSG cell only allows UE measurement reporting for the CSG cell to other cells by authorized CSG radio terminals (step S6).

Figure 10:
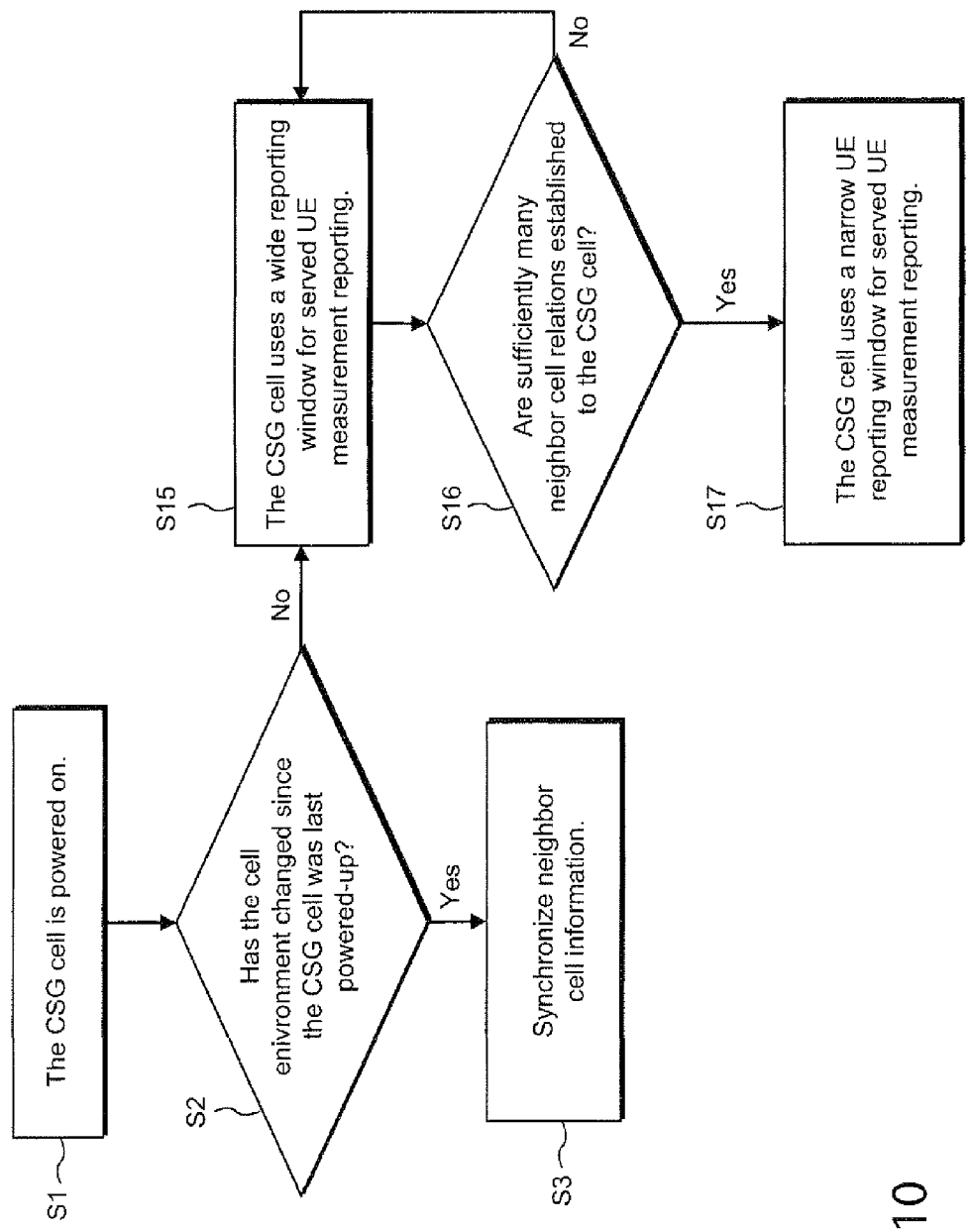
FIG. 10 is a flow chart diagram illustrating non-limiting, example procedures for a CSG cell that has powered-on initially using wide UE measurement reporting for the CSG cell followed by narrow UE measurement reporting.

FIG. 10 is a flow chart diagram illustrating non-limiting, example procedures for a CSG cell that has powered-on initially using wide radio terminal measurement reporting for the CSG cell followed by narrow radio terminal measurement reporting. Steps S1-S3 are similar to those described in conjunction with FIG. 7. However, in step S2, if the CSG cell environment has changed, the CSG cell uses a "wide" reporting window for served radio terminal measurement reporting (step S15). A wide reporting window means that the served radio terminals report fairly low received signal quality candidate cells in order to generate neighbor cell relation information. The wide reporting window may be infinite, meaning that all detected cells are reported initially. But after some condition is fulfilled, (e.g., a number of established cell relations is greater than a threshold (step S16)), the CSG cell enters a post initialization state where a relatively narrow reporting window is used (step S17). A narrow reporting window means that the served radio terminals report only high quality received signal quality candidate cells, e.g., as determined by a predetermined threshold.

Figure 11A:
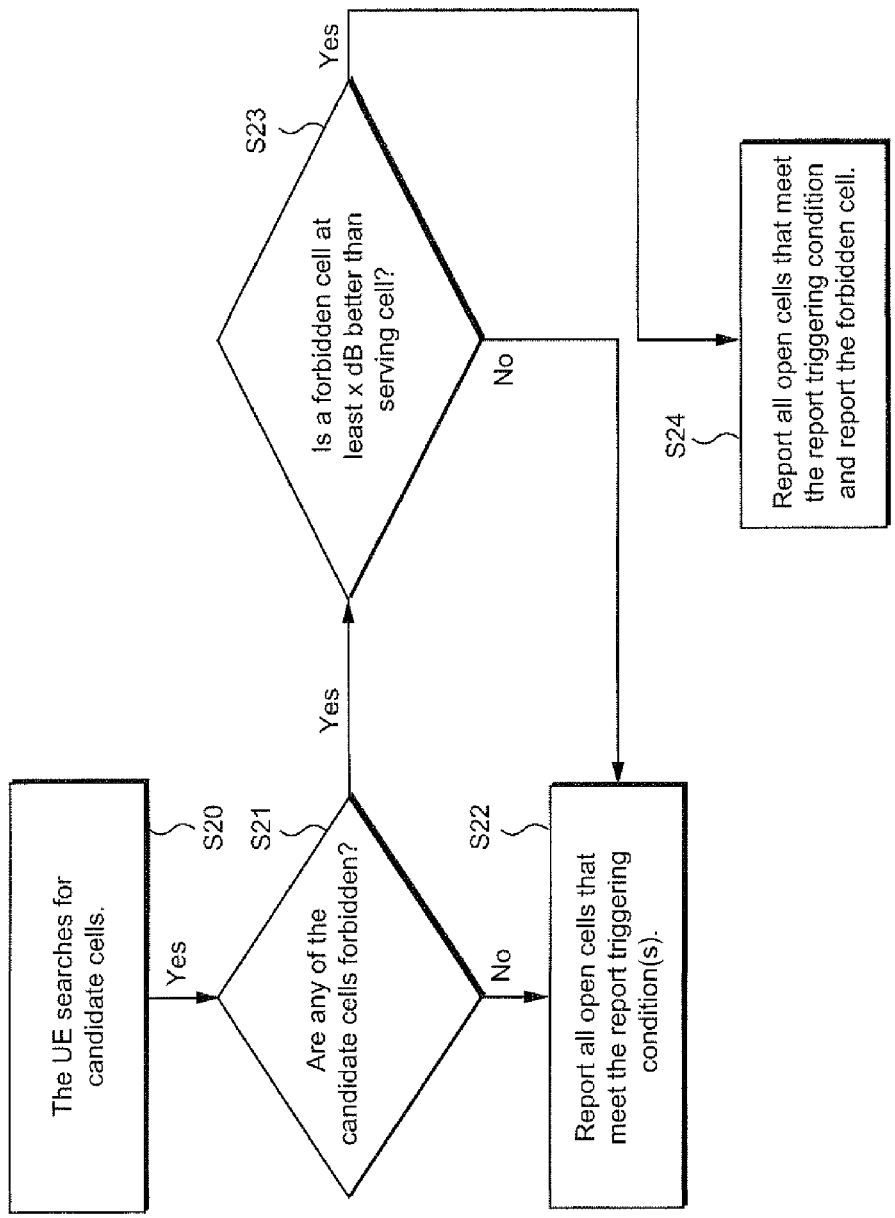
FIG. 11A is a flow chart diagram illustrating non-limiting, example set of cell reporting procedures.
Figure 11B:
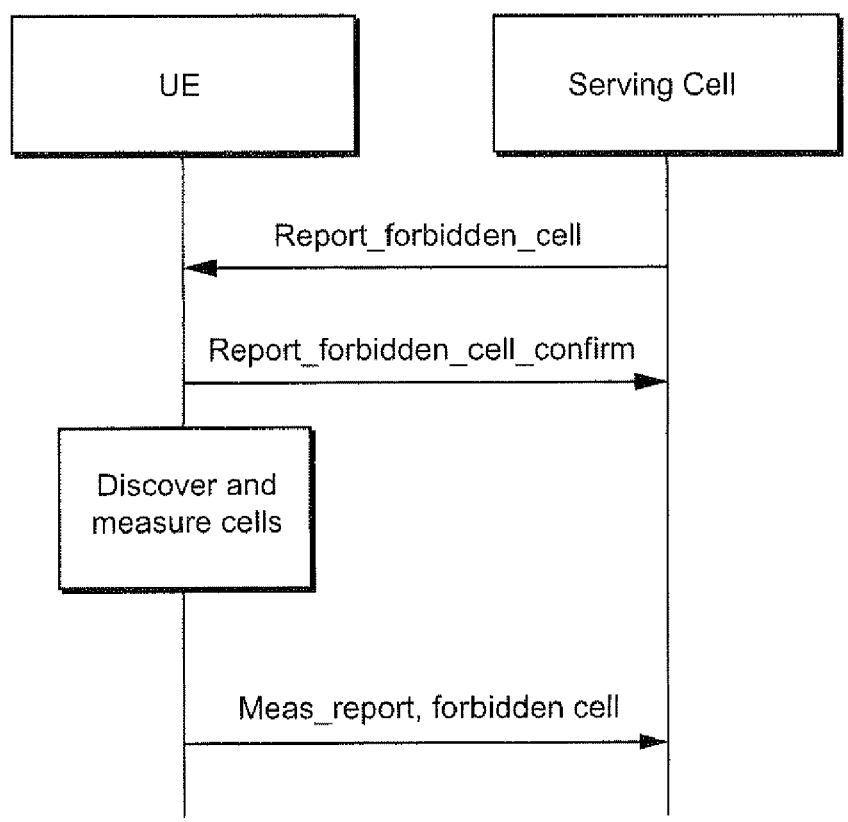
FIG. 11B is a diagram illustrating a non-limiting signaling for implementing the cell reporting procedures in FIG. 11A.

FIG. 11A is a flow chart diagram illustrating non-limiting, example set of cell reporting procedures, and FIG. 11B is a diagram illustrating a non-limiting signaling for implementing the cell reporting procedures in FIG. 11A. They illustrate how the serving base station may instruct radio terminals to report CSG cell broadcast signals that are received with high quality even though they are forbidden cells. The radio terminal compares the signal quality of a signal transmitted by the serving base station to the signal quality of a signal transmitted by other base stations. In commonly-assigned U.S. application Ser. No. 12/153,797 entitled "Closed Subscriber Group Cell Handover," filed on May 23, 2008, it is possible to instruct radio terminals to exclude cells that are forbidden, either by signaling a black list from the serving base station or by broadcast signaling by the CSG cells. In FIG. 11B, the radio terminal (UE) searches for candidates cells (step S20) and identifies forbidden cells among the detected candidate cells (step S21). The terminal compares the signal quality of the signal transmitted by the detected forbidden/CSG cell(s) to the signal quality received from the serving cell's signal. Any forbidden/CSG cell signal quality that exceeds the serving cell signal quality by a predetermined amount, indicated here as x dB, is reported to the serving cell (steps S23 and S24). If not, then the terminal reports signal quality measurements for all open cells that meet report triggering condition(s) (step S22). The predetermined amount, e.g., x dB, may be adjusted over time, for example based on statistics of how often the reported forbidden cells were already known by the serving cell.

FIG. 11B illustrates example signaling between the serving base station and the radio terminal. First, the serving base station informs the radio terminal that it should report forbidden cells if a given criterion is fulfilled. This criterion may be that the signal quality of a forbidden cell's signal exceeds the signal quality of the serving cell's signal by a given amount as explained in step S23. If a forbidden cell measurement causes the criterion to be fulfilled, the radio terminal sends a report to the serving base station, including a physical identity of the CSG cell. The serving cell may respond by requesting the radio terminal to decode and report the cell global identity of the CSG cell.

Figure 12:
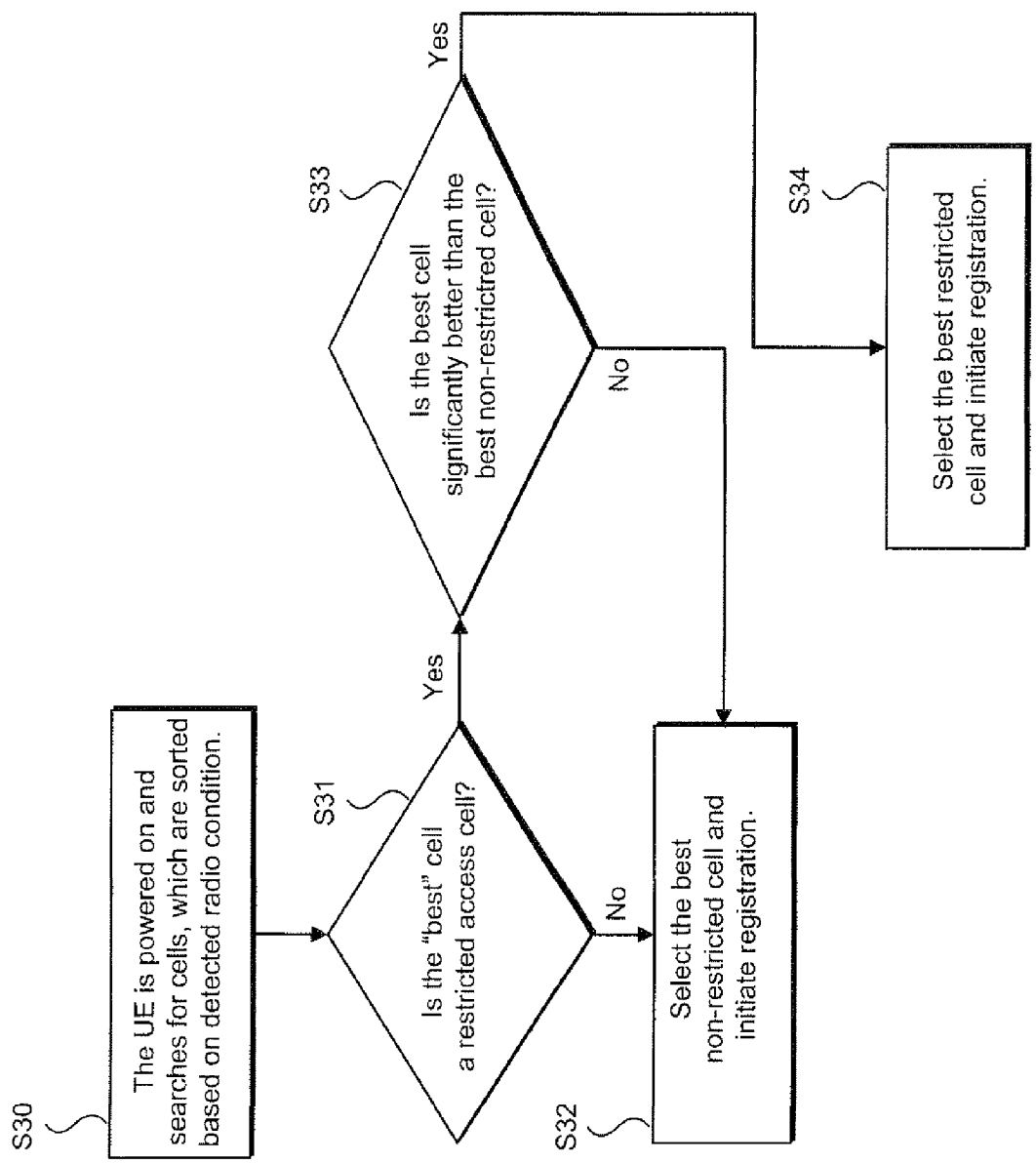
FIG. 12 is a flow chart diagram illustrating one non-limiting, example set of cell selection procedures when a UE has powered-on near a CSG cell.
Figure 13:
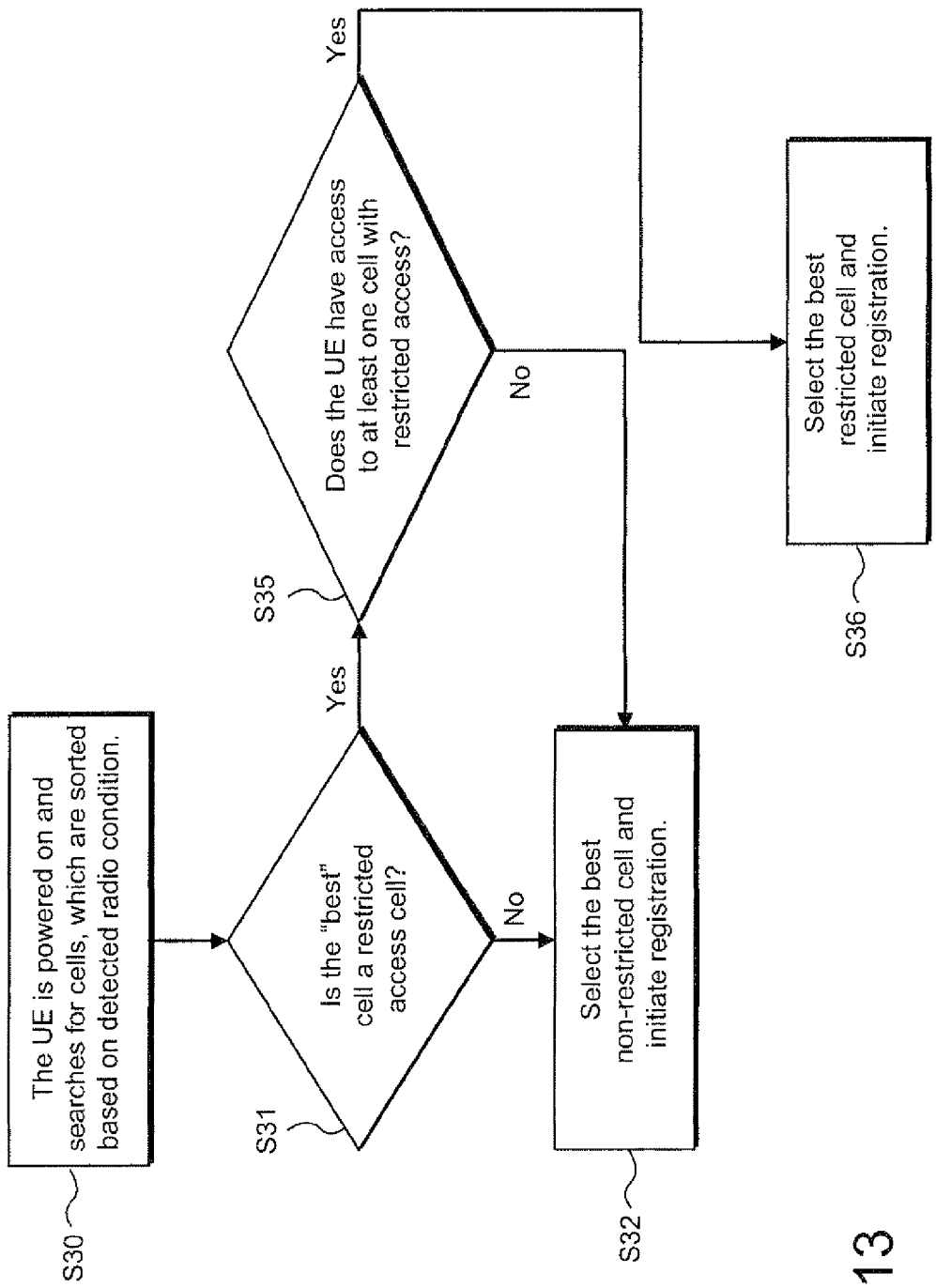
FIG. 13 is a flow chart diagram illustrating another set of non-limiting, example cell selection procedures when a UE has powered-on near a CSG cell.

FIGS. 12 and 13 relate to specific radio terminal cell selection procedures. FIG. 12 is a flow chart diagram illustrating one non-limiting, example set of cell selection procedures when a radio terminal has powered-on near a CSG cell. Together with the general rule that a mobile terminal should not report or register with (attach to) a forbidden cell that broadcasts cell barred, cell restricted, CSG cell, or is black listed, this non-limiting example embodiment adds a new cell selection option. The radio terminal, after powering-on, searches for broadcast signals from neighboring cells. The detected cells are sorted according to received signal quality (step S30). A determination is made whether the cell with the best measured signal quality is a forbidden or restricted access cell (step S31). If so, the radio terminal determines whether this best restricted access cell is significantly better (e.g., by some predetermined amount like x dB) than a best non-restricted access neighboring cell (step S33), and tries to register with/select/attach to that cell (step S34).

A serving base station may request all or a subset of all active radio terminals being served to report signal quality measurements for forbidden cells at least once. A radio terminal need only to report this once to the serving base station and the report should preferably contain the local and global cell identifiers, and possibly the measured radio condition corresponding to the CSG cell. As a result, a radio terminal may report a CSG cell that is unknown to the serving cell simply because it happens to be near the CSG cell. If the radio terminal is authorized, a neighbor relation may be set up between the serving cell and the reported CSG cell, and the serving cell can then order the radio terminal to perform a handover to the newly-detected authorized CSG cell. Such a one time report procedure can be enabled and disabled by the serving base station as desired or based on some condition.

FIG. 13 is a flow chart diagram illustrating another non-limiting, example set of cell selection procedures when a radio terminal has powered-on near a CSG cell. Here, only radio terminals with access to at least one restricted access cell are entitled to consider a CSG cell in the selection procedure in order to limit reporting and/or attempts to register with the CSG by unauthorized radio terminals. Steps S30-S32 are similar to those described in conjunction with FIG. 12. If the best cell is a restricted access cell in step S31, then a determination is made in step S35 whether the radio terminal is authorized to access at least one restricted access cell. If not, the radio terminal selects the best non-restricted access cell to initiate registration (step S32). Otherwise, the radio terminal selects the best restricted access cell to initiate registration (step S36).

The technology described provides a fast CSG cell neighbor cell relation list initialization procedure, which benefits from information about neighbors stored since the CSG cell was previously powered-on. With the introduction of mechanisms that limit signal quality reporting of CSG cells, there is a need to enable reporting of new CSG cells in order to automatically integrate them in the network. The technology describes mechanisms to provide measurement information from radio terminals in selected cases. One example case is when a radio terminal served by a cell detects a CSG cell which is considered forbidden, but the received signal quality of a signal from the CSG cell exceeds at least by a predetermined amount the signal quality of a signal from the serving base station. In this situation, it is possible to detect and report signal quality measurements for a forbidden CSG cell if the radio terminal is close enough to that CSG cell. Other mechanisms support fast neighbor cell relation establishment by inheriting neighbor information from other neighboring cells, as well as CSG cell initial states with wide cell reporting to rapidly gather and establish in the network neighbor cell relation information associated with the CSG cell. Furthermore, the forbidden status of the CSG cell may be relieved initially when a CSG cell is initialized in order to facilitate efficient and effective establishment of neighbor cell relations to other cells.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for managing neighbor cell relation lists of a closed subscriber group (CSG) cell served by a CSG base station, where only a radio terminal belonging to the CSG is permitted to access and receive service from the CSG cell, and where information is provided to radio terminals in the cells neighboring the CSG cell that generally indicates that radio terminals are not to report to a respective serving base station signal quality measurements of a signal received from the CSG base station unless the radio terminal is a member of the closed subscriber group for the CSG cell, the method comprising the steps of:
 (a) powering-up the CSG cell;
 (b) determining whether the CSG cell has previously been powered-on in a same environment;
 (c) if the CSG cell is powered-on in the same environment, updating neighbor cell relation information for the CSG cell by comparing information with one or more other network nodes; and
 (d) if the CSG cell is not powered-on in the same environment, initializing neighbor cell relation information for the CSG cell.

2. The method in claim 1, wherein the environment includes a location of the CSG cell.

3. The method in claim 1, wherein the environment includes network connectivity information associated with the CSG base station.

4. The method in claim 3, wherein the connectivity information includes CSG base station connection address information including one or more of: an internet protocol address, internet protocol subnet information, or information about an internet service provider providing network connectivity to the CSG base station location.

5. The method in claim 1, wherein the CSG base station informs the central node that the environment has changed.

6. The method in claim 5, wherein the CSG base station includes means for permitting an owner or operator of the CSG base station to trigger a message to the central node informing that the CSG base station is in a new environment.

7. The method in claim 1, wherein the environment includes a cell network in which the CSG cell is a member and a different environment includes a change in neighbor cell relation information for one or more other cells in the cell network since a last time the CSG cell was powered-on.

8. A method for initializing a closed subscriber group (CSG) cell served by a CSG base station, where in general only a radio terminal belonging to the CSG is permitted to access and receive service from the CSG cell, and where the CSG base station signals that the CSG cell is a forbidden cell over a broadcast channel of the CSG cell, the method comprising the following steps after the CSG cell powers-up:
 (a) halting signaling that the CSG cell is a forbidden cell so that radio terminals served by neighboring cells can report signal quality measurements associated with the CSG cell to their serving cells; and
 (b) when a predetermined number of neighbor cells are included in a neighbor cell list for the CSG cell, informing radio terminals that the CSG cell is a forbidden cell where only radio terminals belonging to the closed subscriber group of the CSG cell may report signal quality measurements for the CSG cell to their respective serving cells,
 wherein steps (a) and (b) are not performed if the CSG cell has not been moved to a new location different from a location when the CSG cell was last powered-up or if a neighbor cell relation information for multiple cells in a cell network that the CSG cell belongs to has not changed since a last time the CSG cell was powered-on, in which case, neighbor cell information associated with the CSG cell is updated.

9. The method in claim 8, wherein steps (a) and (b) are performed by the CSG base station.

10. The method in claim 8, wherein steps (a) and (b) are performed if the CSG cell has been moved to a new location different from a location when the CSG cell was last powered-up or if a neighbor cell relation information for multiple cells in a cell network that the CSG cell belongs to has changed since a last time the CSG cell was powered-on.

11. The method in claim 8, wherein after the CSG cell powers-up, the method further comprises:
 identifying a first cell that is a neighboring cell to the CSG cell;
 adding one or more neighbor cells associated with the first cell as one or more neighbor cells associated with the CSG cell until a predetermined number of neighbor cells is included in a neighbor cell relations list for the CSG cell.

12. The method in claim 11, wherein the neighbor cell relation list information of the first cell is signaled from a central node to the CSG base station serving the CSG cell.

13. The method in claim 11, wherein the neighbor cell relation list information of the first cell is signaled from the first base station serving the first cell to the CSG cell.

14. The method in claim 11, wherein the adding of one or more neighbors associated with the first cell is performed if the CSG cell has been moved to a new location different from a location when the CSG cell was last powered-up or if neighbor cell relation information for multiple cells in a cell network that the CSG cell belongs to has changed since a last time the CSG cell was powered-on.

15. A closed subscriber group (CSG) base station for serving a CSG cell, where in general only a radio terminal belonging to the closed subscriber group is permitted to access and receive service from the CSG cell, and where the CSG base station signals that the CSG cell is forbidden over a broadcast channel of the CSG cell, the CSG base station comprising:
   radio transceiving circuitry, and
   a data processing system including electronic circuitry configured, when the CSG cell is powered-up, to perform the following tasks:
   (a) initially inhibit signaling via the radio transceiving circuitry that the CSG cell is forbidden so that radio terminals served by neighboring cells can report a received signal quality associated with the CSG cell to their serving cells; and
   (b) thereafter, when a predetermined number of neighbor cells are included in a neighbor cell list for the CSG cell, signaling, via the radio transceiving circuitry, that the CSG cell is a forbidden cell where only radio terminals belonging to the closed subscriber group of the CSG cell may report signal quality measurements for the CSG cell to their respective serving cells,
   wherein tasks (a) and (b) are not performed if the CSG cell has not been moved to a new location different from a location when the CSG cell was last powered-up or if a neighbor cell relation information for multiple cells in a cell network that the CSG cell belongs to has not changed since a last time the CSG cell was powered-on, and
   wherein if the CSG cell has not been moved to a new location different from a location when the CSG cell was last powered-up or if a neighbor cell relation information for multiple cells in a cell network that the CSG cell belongs to has not changed since a last time the CSG cell was powered-on, neighbor cell information associated with the CSG cell is updated.

16. The CSG base station in claim 15, wherein tasks (a) and (b) are performed if the CSG cell has been moved to a new location different from a location when the CSG cell was last powered-up or a neighbor cell relation information for multiple cells in a cell network that the CSG cell belongs to has changed since a last time the CSG cell was powered-on.

17. The CSG base station in claim 15, wherein the CSG base station includes means to permit a CSG base station owner or operator to trigger a message to a central node informing that the CSG base station is in a new environment.

18. The CSG base station in claim 15, wherein the CSG base station includes means to permit a CSG base station owner or operator to inhibit signaling via the radio transceiving circuitry that the CSG cell is forbidden so that radio terminals served by neighboring cells can report a received signal quality associated with the CSG cell to their respective serving cell.

19. The CSG base station in claim 15, wherein the CSG base station includes means to permit a CSG base station owner or operator to initiate signaling via the radio transceiving circuitry indicating that the CSG cell is a forbidden cell so that radio terminals served by neighboring cells are instructed not to report a received signal quality associated with the CSG cell to their respective serving cell.

20. A network node for use in a network including open base stations associated with open access cells and a closed subscriber group (CSG) base station serving a CSG cell in which only a radio terminal belonging to the CSG is permitted to access and receive service from the CSG cell, and where information is provided to radio terminals in cells neighboring the CSG cell that generally indicates that radio terminals are not to report to a respective serving base station signal quality measurements of a signal received from the CSG base station unless the radio terminal is a member of the closed subscriber group, the network node comprising:
   a memory for storing CSG base station environment information
   a controller configured to:
      detect the CSG base station environment information of a CSG base station recently powered-up for operation;
      determine whether the CSG base station is in the same environment after being powered-up compared to the stored environment information from when the CSG base station was powered-up the last time; and
      if the CSG base station is not powered-on in the same environment, initialize neighbor cell relation information for the CSG base station.

21. The network node in claim 20, wherein the network node is a central node coupled to the CSG base station and other base stations, and wherein the memory stores (i) a neighbor cell relation list for each open cell, (ii) a neighbor cell relation list for each CSG cell, and (iii) a CSG authorization list which, for each of multiple radio terminals, identifies all CSG cells that the radio terminal is authorized to access and receive service from.

22. The network node in claim 20, wherein the CSG base station informs the network node of a changed environment.

23. The network node in claim 20, wherein the network node is a base station.

* * * * *

UNITED STATES PATENT AND TRADEMARK OFFICE
CERTIFICATE OF CORRECTION

PATENT NO.         : 8,165,590 B2
APPLICATION NO.    : 12/143504
DATED              : April 24, 2012
INVENTOR(S)        : Gunnarsson et al.

It is certified that error appears in the above-identified patent and that said Letters Patent is hereby corrected as shown below:

In Fig. 7, Sheet 7 of 14, for Tag "S2", in Line 2, delete "enivronment" and insert -- environment --, therefor.

In Fig. 9, Sheet 9 of 14, for Tag "S2", in Line 2, delete "enivronment" and insert -- environment --, therefor.

In Fig. 10, Sheet 10 of 14, for Tag "S2", in Line 2, delete "enivronment" and insert -- environment --, therefor.

In Fig. 12, Sheet 13 of 14, for Tag "S33", in Line 3, delete "non-restrictred" and insert -- non-restricted --, therefor.

In Column 9, Line 28, delete "registration, Then," and insert -- registration. Then, --, therefor.

Signed and Sealed this
Twenty-ninth Day of January, 2013

David J. Kappos
*Director of the United States Patent and Trademark Office*